(12) United States Patent
Smith et al.

(10) Patent No.: US 11,128,119 B2
(45) Date of Patent: Sep. 21, 2021

(54) COORDINATED RECLOSING IN A POWER DISTRIBUTION SYSTEM

(71) Applicant: Florida Power & Light Company, Juno Beach, FL (US)

(72) Inventors: David L. Smith, Debary, FL (US); Michael J. Putt, Palm City, FL (US); Benny Naranjo, Miami, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 929 days.

(21) Appl. No.: 15/628,622

(22) Filed: Jun. 20, 2017

(65) Prior Publication Data
US 2018/0366937 A1 Dec. 20, 2018

(51) Int. Cl.
| | |
|---|---|
| *H02H 3/00* | (2006.01) |
| *H02H 5/00* | (2006.01) |
| *H02H 3/06* | (2006.01) |
| *H02H 3/07* | (2006.01) |
| *H02H 3/05* | (2006.01) |
| *H02H 7/30* | (2006.01) |

(52) U.S. Cl.
CPC .............. *H02H 3/063* (2013.01); *H02H 3/05* (2013.01); *H02H 3/07* (2013.01); *H02H 7/30* (2013.01); *H02H 3/006* (2013.01)

(58) Field of Classification Search
CPC .......... H02H 3/063; H02H 3/006; H02H 3/05; H02H 7/30

USPC .......................................................... 361/71
See application file for complete search history.

(56) References Cited

U.S. PATENT DOCUMENTS

| | | | |
|---|---|---|---|
| 3,416,035 A * | 12/1968 | Lipnitz | H02H 3/07 361/73 |
| 6,347,027 B1 * | 2/2002 | Nelson | H02H 1/0092 361/64 |
| 2010/0036538 A1 * | 2/2010 | Stergiou | H02H 7/30 700/292 |

* cited by examiner

*Primary Examiner* — Jared Fureman
*Assistant Examiner* — Lucy M Thomas
(74) *Attorney, Agent, or Firm* — Tarolli, Sundheim, Covell & Tummino LLP (57) ABSTRACT

A power distribution system adapted for high current fault management during a fault event utilizes reclosing switches configured for a quick-slow-quick reclosing sequence in which the reclosing switch initially responds to the fault condition by tripping open, and then after a delay recloses for a first duration of time (slow) prior to tripping open. After another delay, the reclosing switch recloses for a second duration of time (quick) that is less than the first duration of time prior to tripping open for an indefinite interval. When installed in new segments or retrofitted in place of a fuse, reclosing switches configured with quick-slow-quick reclose timing allows for reduction of downstream customer outages, reduced $I^2T$ exposure for elements upstream of a fault event and a reduction in the duration of voltage sags experienced by customers during fault events while allowing for improved fault management configurations of the power distribution system.

21 Claims, 4 Drawing Sheets

COORDINATED RECLOSING IN A POWER DISTRIBUTION SYSTEM

BACKGROUND OF THE INVENTION

Field of the Invention

The present invention relates to fault management and recovery in an electrical power distribution system and more particularly to reclosing during fault management and recovery in an electrical power distribution system.

Description of the Related Art

An electrical power distribution system is an interconnected system for delivering electricity from suppliers to consumers. An electrical power distribution system generally includes a power grid defined by one or more electrical power generating stations that produce electrical power, high-voltage transmission lines that carry the generated power from the point of generation to demand centers, and distribution lines that connect individual customers so that those customers may receive and consume the electrical power generated originally in the generating stations. Intermediate to the distribution lines and the high-voltage transmission lines are sub-stations. Sub-stations "step down" the power from the high voltage of the transmission line to a lower distribution voltage suitable for distribution to customers, and one or more feeder backbones each served by a feeder breaker to further distribute power from each substation to different lateral branches to which the individual customers are coupled by transformers that further step down the power to a service level voltage.

Various types of fault events, also referred to as faults, can occur in an electrical power distribution system, some of which result in power outages—the loss of electrical power service to a selection of individual customers. One type of fault is the "short circuit" or high current fault which may be caused by a tree branch contacting a power line during a storm. Another type of fault is an "open conductor element" fault that may be caused by a power line snapping open during a storm, or by a coupling joining two power lines becoming deficient and then failing so as to result in an open conductor condition. In consequence of a fault, not only will the transmission of electrical power become disrupted as downstream elements of the system de-energize, but the upstream equipment in the distribution system may become substantially damaged through a high increase in electrical current. Consequently, various protective elements are strategically disposed about the electrical power distribution system.

Common protective elements in an electrical grid include fuses, protective relays and circuit breakers. The quintessential protective device is the fuse. When the current through a fuse exceeds a certain threshold, the fuse element melts resulting in an open thereby interrupting the circuit. More recently introduced, the protective relay is mechanically more sophisticated than a fuse and is characterized as a relay device designed to trip a circuit breaker when a fault is detected. The first protective relays were electromagnetic devices, relying on coils operating on moving parts to provide detection of abnormal operating conditions such as over-current, over-voltage, reverse power flow, over-frequency, and under-frequency. Microprocessor-based digital protection relays emulate mechanically actuated devices while providing supervision impractical with electromechanical relays. A fuse (herein collectively referring to a fuse, protective relay or circuit breaker) may remain open after being tripped, consequently a truck "roll" is necessary, wherein a repair crew locates the tripped device, determines and repairs the cause of the fault that tripped the device, and then restores the tripped device to a closed state either by replacing the fuse or resetting or closing the breaker. Often times, it has been discovered, that the fault clears itself. For example a fallen tree branch shorts a distribution line during the storm, tripping a fuse, and then falls to the ground thereby clearing the fault without assistance from the repair crew. In this case the "roll" need only restore the tripped device to restore power to downstream elements of the system.

Of note, a recloser is an advanced type of circuit breaker equipped with a mechanism that automatically closes a breaker after the breaker has been tripped open due to a fault. More specifically, a recloser combines a circuit breaker that trips if an overcurrent is detected thereby indicating a short circuit somewhere downstream in a section of the system, with an electronically-controlled reclosing function that automatically restores power to the affected line if the fault clears itself quickly—which is known generally to happen with great frequency. In the event the fault is persistent, such as a fallen tree resting on a power line, then the recloser will eventually remain open and a truck roll will be required to clear the fault. As will be apparent, then, by deploying reclosers in an existing electrical power distribution system, prolonged power outages caused by transient short circuits may be avoided so as to result in better supply continuity to customers, and the automated restoration of power after a transient fault avoids the need to "roll" a service squad on site to repair a fuse.

BRIEF SUMMARY OF THE INVENTION

Embodiments of the present invention address deficiencies of the art in respect to fault management in an electrical power distribution system and provide for power distribution fault management utilizing quick-slow-quick sequenced reclosing switches. In an embodiment of the invention, a power distribution system may include a substation coupled to a multiplicity of feeder breakers over a bus, with the substation distributing electrical power to each of the feeder breakers. Each of the feeder breakers may have a physical coupling over a feeder backbone to a multiplicity of lateral sections supplying a portion of the electrical power to different endpoints. Optionally, an automated feeder switch may be disposed in the feeder backbone. Finally, a multiplicity of reclosing switches each join a selected one of the lateral sections to a corresponding feeder backbone of one of the feeder breakers in place of a first stage fuse. But, for each of the lateral sections, a fuse may be disposed downstream from one of the reclosing switches joining a corresponding one of the lateral sections to the feeder backbone.

The reclosing switches may each include a quick-slow-quick reclosing sequence during a fault condition in which the reclosing switches each initially responds to the fault condition by quickly tripping and then after a delay reclosing for a first slower duration of time prior to tripping once again, and then reclosing for a second quicker duration of time prior to opening for an indefinite duration of time, wherein the time to trip of the first duration of time is slow relative to the time to trip of the second duration. In one aspect of the embodiment, for each of the reclosing switches, a delay in reclosing between the reclosing for the first duration of time and the reclosing for the second duration of time is longer than a delay in the reclosing for the first duration of time subsequent to the tripping in response to the fault condition.

Of note, one of the feeder breakers is enabled with a feeder breaker relay adapted to reclose according to a quick-slow-slow-slow reclosing sequence. Alternatively, one of the feeder breakers is enabled with a feeder breaker relay adapted to perform reclosing according to a slow-slow-slow-slow reclosing sequence. Consequently, in the latter instance a downstream device is allowed more time to interrupt the fault which reduces the number of customers experiencing a power interruption.

In another embodiment of the invention, a power distribution fault management method includes coordinating a feeder breaker relay and a reclosing switch in a section of an electrical power distribution system. The coordination includes configuring the reclosing switch to operate during a fault condition according to a quick-slow-quick reclosing sequence in which the reclosing switch initially responds to the fault condition by tripping and then after a delay recloses for a first duration of time prior to tripping once again, and then after a delay recloses for a second duration of time less than the first duration of time prior to again tripping, wherein the time to trip of the first duration of time is slow and the time to trip of the second duration of time is quick. Finally, the method includes energizing the section of the electrical power distribution system.

In one aspect of the embodiment, a delay in reclosing between the reclosing for the first duration of time and the reclosing for the second duration of time is longer than a delay in performing the reclosing for the first duration of time subsequent to the tripping in response to the fault condition. In another aspect of the embodiment, the coordinating additionally includes configuring the feeder breaker relay to operate according to a quick-slow-slow-slow reclosing sequence. In even yet another aspect of the embodiment, the coordinating additionally includes configuring the feeder breaker relay to operate according to a slow-slow-slow-slow reclosing sequence. Finally, in even yet another aspect of the embodiment, at any time, a time delay to trip based on the fault current magnitude experienced by the feeder breaker relay sufficient to trip the feeder breaker relay remains longer than a time delay to trip based on the fault current magnitude experienced by the reclosing switch sufficient to trip the reclosing switch during a fault condition downstream of the reclosing switch. Thus, in this embodiment the reclosing switch may trip before the feeder breaker relay would trip.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for power distribution fault management utilizing quick-slow-quick sequenced reclosing switches. Typically, under a persistent high current fault condition a reclosing switch will perform multiple reclosings before permanently locking in an open circuit configuration. The timing of when the reclosing switch performs reclosing may be configured so as to coordinate the operation of an upstream relay, for instance at a feeder breaker. As well, the duration during which the reclosing switch remains closed before reopening during a fault condition is configured so as to coordinate the operation of an upstream relay. Reducing the duration in which the reclosing switch remains closed reduces high current damage to upstream elements of the electric distribution grid subject to the high current of the fault while also allowing for fault clearing. In this regard, coordinating the operation of an upstream relay at a feeder breaker with the operation of the reclosing switch and one or more downstream fuses is a consideration of power distribution engineering. An objective is to permit the device closest to a fault to open without excessive interruption of service to other customers while also protecting upstream equipment from high current damage due to the fault.

As such, the conventional manner of coordinating the operation of a feeder breaker relay with a downstream reclosing switch is to operate the downstream reclosing switch according to a sequence in which at first, a minimal delay is incurred subsequent to a detected fault before performing reclosing, and if unsuccessful, a longer delay is incurred before performing reclosing, and then again, if unsuccessful, another long delay is incurred before performing reclosing. The long periods of delay may provide additional time for the downstream fault to clear on its own. As well, the downstream reclosing switch is adapted for "quick-slow-slow" operation such that the period of time during which the downstream reclosing switch is held closed before reopening is short at first and longer for a first reclosing so as to allow a downstream fuse to open and thus isolate the fault. The longer reclosing by the downstream reclosing switch, however, may create undesirable fault current on the bus connecting an upstream feeder breaker to the sub-station. Additionally, long exposures to high current faults referred to as FT damage may shorten the life of upstream equipment. It should be further noted that although the relays, reclosing switches and fuses are generally not controlled by a master controller and are not in communication with each other, they do share their mutual couplings facilitating the distribution of electrical power through the distribution system.

In accordance with an embodiment of the invention, a reclosing switch retrofits or joins in place of a fuse coupling a lateral segment of an electrical power distribution system to a feeder backbone supplied by a feeder breaker. The reclosing switch is programmed with a quick-slow-quick reclosing sequence in which the reclosing switch initially quickly responds to the fault condition by tripping open and then after a delay recloses for a first duration of time prior to tripping open once again, and then recloses for a second duration of time prior to tripping open wherein the second duration of time has a shorter duration of time, or is less than the first duration of time. Thus, at a given fault current the time delay to trip of the first duration of time is slow and the time delay to trip of the second duration of time is quick. The reclosing sequence of the reclosing switch is coordinated with that of an upstream relay in the feeder breaker which may be quick-slow-quick-quick. Optionally the reclosing sequence of the reclosing switch is coordinated with that of the upstream relay in the feeder breaker which may be, slow-quick-quick-quick, slow-quick-quick-slow, or slow-slow-slow-slow, wherein the first slow sequence ensures that the time delay to trip based on the fault current magnitude experienced by the relay in the feeder break sufficient to trip the relay remains longer than a time delay to trip based on the fault current magnitude experienced by the reclosing switch sufficient to trip the reclosing switch during a fault condition downstream of the reclosing switch. Thus, the reclosing switch may trip open before the relay would trip open. While the slow-slow-slow-slow sequence allows the most opportunity for a downstream reclosing switch or fuse to open thereby minimizing the number of customers experiencing a prolonged power outage, it also allows for the greatest voltage sag and potential $I^2T$ damage. On the other hand the slow-quick-quick-quick sequence reduces voltage sag and potential $I^2T$ damage; it also increases the likelihood that a downstream reclosing switch or fuse may not open thereby increasing the number of customers experiencing a prolonged power outage. The slow-quick-quick-slow mixes the characteristics of the slow-slow-slow-slow and the slow-quick-quick-quick sequences shortening the duration of the closing for the middle two sequences relative to the slow-slow-slow-slow sequence thereby reducing voltage sag and potential $I^2T$ damage while having a final slow sequence relative to the slow-quick-quick-quick sequence and giving a final opportunity for a downstream reclosing switch or fuse to open to the relay opening for a prolonged time.

Figure 1:
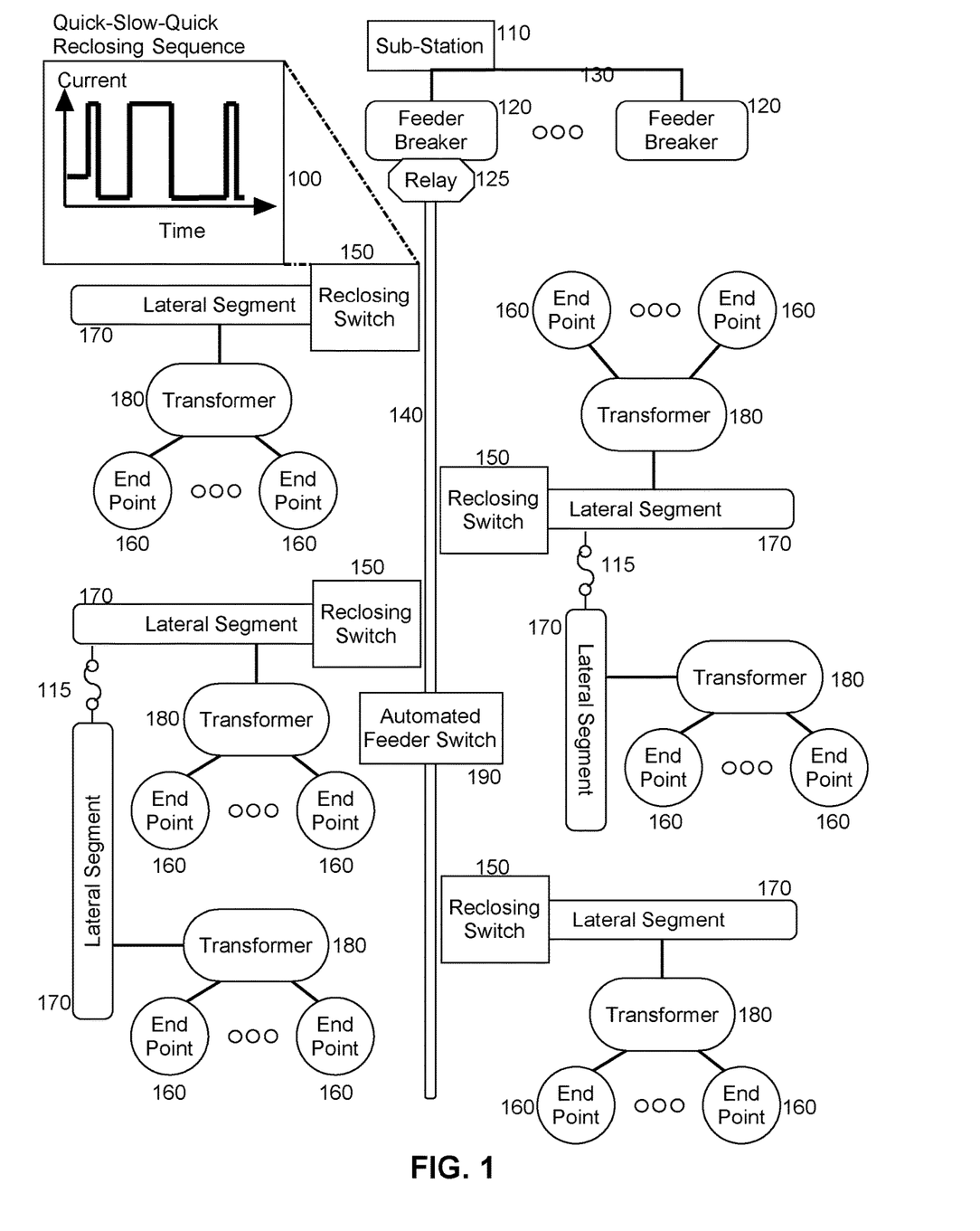
FIG. 1 is an architecture diagram of an electrical power distribution system configured for power distribution fault management utilizing quick-slow-quick sequenced reclosing switches.

In further illustration, FIG. 1 is an architecture diagram of an electrical power distribution system configured for power distribution fault management utilizing quick-slow-quick sequenced reclosing switches. As shown in FIG. 1, an electrical power distribution system includes a sub-station 110 stepping-down voltage transmitted from a generation station (not shown) for distribution to one or more feeder breakers 120 over a bus 130. Each of the feeder breakers 120 includes a relay 125 programmed for reclosing in accordance with a reclosing sequence of either quick-slow-slow-slow, slow-quick-quick-quick, slow-quick-quick-slow, or slow-slow-slow-slow. Each feeder breaker 120 in turn distributes electrical power to different lateral segments 170 over a feeder backbone 140 (only a single feeder backbone 140 shown for ease of illustration). Optionally, different portions of the feeder backbone 140 include an automated reclosing feeder switch 190 which may be configured to operate similar to relay 125, or in an alternative example similar to a reclosing switch 150 and accordingly downstream elements of the automated reclosing feeder switch function similar to a lateral segment downstream of a reclosing switch from the perspective of the scope of this description.

Each of the lateral segments 170 supports electrical power delivery to a set of different end points 160 by way of a transformer 180 which further steps-down the electrical power voltage from a higher distribution voltage to a lower service voltage. Endpoints 160 correspond to residential or industrial consumers of electric power. As can be seen, in some instances, additional lateral segments 170 may be coupled to the feeder backbone 140 by way of another one of the lateral segments 170 coupled to one another by a fuse 115. Each of the lateral segments 170 directly joined to the feeder backbone 140 are done so by way of a reclosing switch 150. Each of the reclosing switches 150 are programmed with a quick-slow-quick reclosing sequence 100 in which the reclosing switch 150 initially responds to the fault condition by quickly tripping open and then after a delay recloses for a first duration of time prior to tripping once again, and then recloses for a second duration of time, shorter duration than the first duration of time, prior to a third tripping open, wherein the time to trip of the first duration of time is slow and the second duration of time is quick relative to each other.

Figure 2:
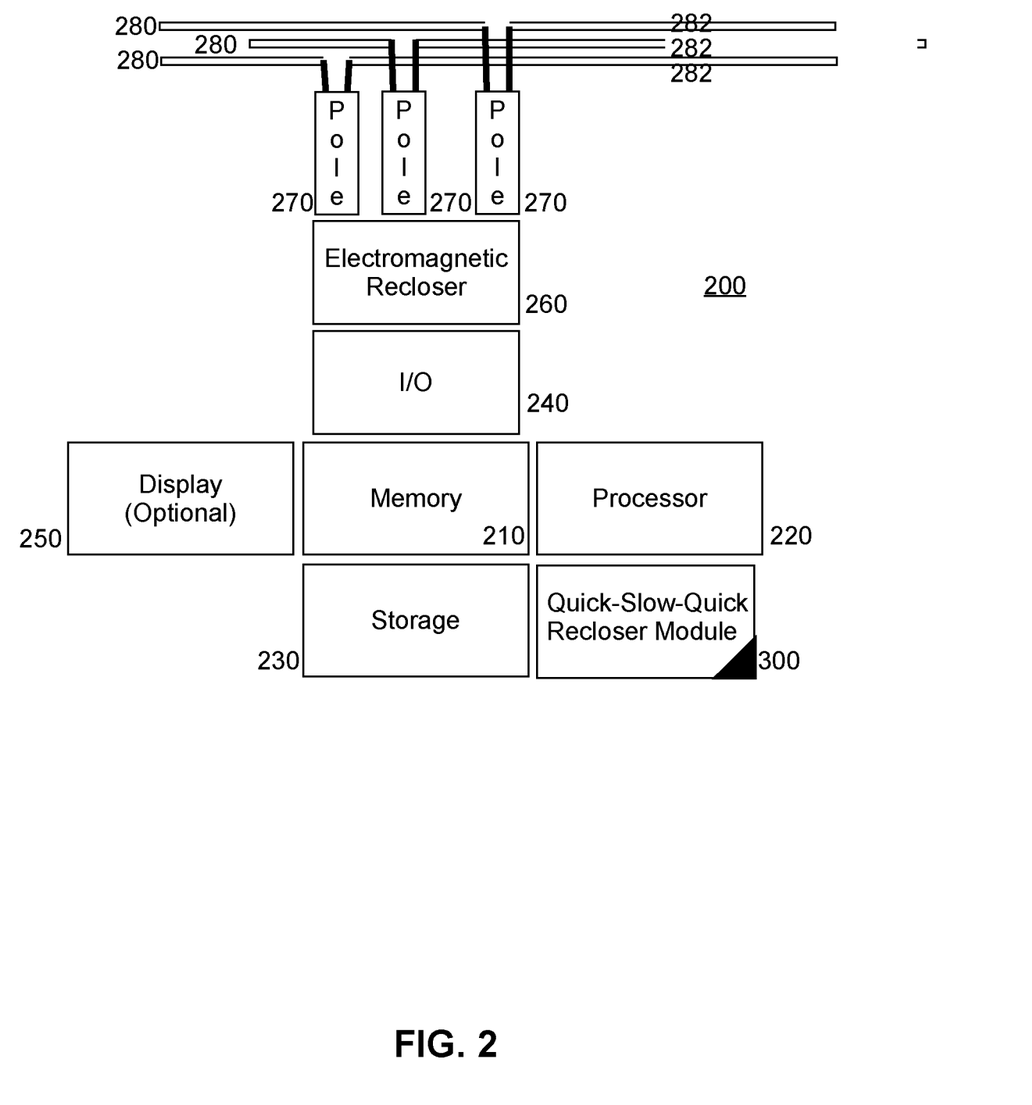
FIG. 2 is a schematic illustration of a reclosing switch adapted for power distribution fault management utilizing quick-slow-quick sequenced reclosing switches.

In yet a further illustration of the structure of the reclosing switch 150, FIG. 2 is a schematic illustration of a reclosing switch adapted for power distribution fault management utilizing quick-slow-quick sequenced reclosing switches. The reclosing switch 200 of FIG. 2 includes a control portion and an electromagnetic actuation portion. The electromagnetic actuation portion includes an electromagnetic recloser 260 driving three different switching poles 270 each physically coupled to a one of three different upstream wires 280 of a power lines for opening and closing the connection to a corresponding three different downstream wires 282 of the power lines, thereby being energized and de-energizing by an associated phase of electrical power distribution. The control portion, in turn, includes an input/output interface 240 driven by a microprocessor 220 executing program code in memory 210 and stored in fixed storage 230. A display 250 optionally is provided through which an operator may interact with the control portion. In another example, a reclosing switch may only open a single pole 270: in this example the reclosing switch 150 for a three phase distribution lateral 170 may include three independent single pole reclosing switches 200, one single pole reclosing switch for each of the three phase lines. In one example the module 300 is a three phase module with a pole switch that opens all three poles, in other examples less than three poles may be opened and/or the module may have less than three poles, such as in the case of a single phase module having a single pole. It should be further noted that the reclosing switch 200 operates autonomously, its operation is primarily responsive to current sensed at the switch and time durations. In this example, there are no communication signals with other elements of the grid, no wired or wireless data transmissions to data processors or reception of commands from external controllers that activate the operation of the reclosing switch. The autonomous operation, while potentially complicating coordinated reclosing in a power distribution system, allows the reclosing switch to be economical while also allowing for simplified installation in remote locations of the electric grid.

Of note, a quick-slow-quick recloser module 300 executes in the memory 210 by the processor 220 so as to control the operation of the electromagnetic recloser 260 through the input/output interface 240. The quick-slow-quick recloser module 300 includes program code that when executed by the processor 220 is operative to sense an overcurrent in the power lines of sufficient magnitude beyond a threshold setting and to respond to the sensed overcurrent by tripping open circuit interruption in the poles 270. The program code may vary the amount of time required for tripping open the circuit based upon the magnitude of the fault current wherein higher fault current results in a shorter delay. The program code is then operative to delay for a period of time before reclosing for a first duration of time prior to tripping open once again for another delay, such that the time to trip during a subsequent or second reclosing is of a lesser duration than the first reclosing at a given fault current. Once again, if the overcurrent condition remains during the subsequent reclosing, the program code is operative to permit once again a tripping of circuit interruption. Also, should it be detected that the fault has cleared on either of the reclosings, then the recloser will remain closed, continuing power distribution downstream of the recloser.

In another example, the program code may be operative to delay for another period of time, subsequent to which the program code of the module 300 is operative to direct an additional reclosing, but for a short duration of time in which the time to trip is quick. Once again, if the overcurrent condition remains during this additional reclosing, the program code is operative to permit a tripping of circuit interruption without further reclosing so as to isolate the fault downstream from the reclosing switch.

Figure 3:
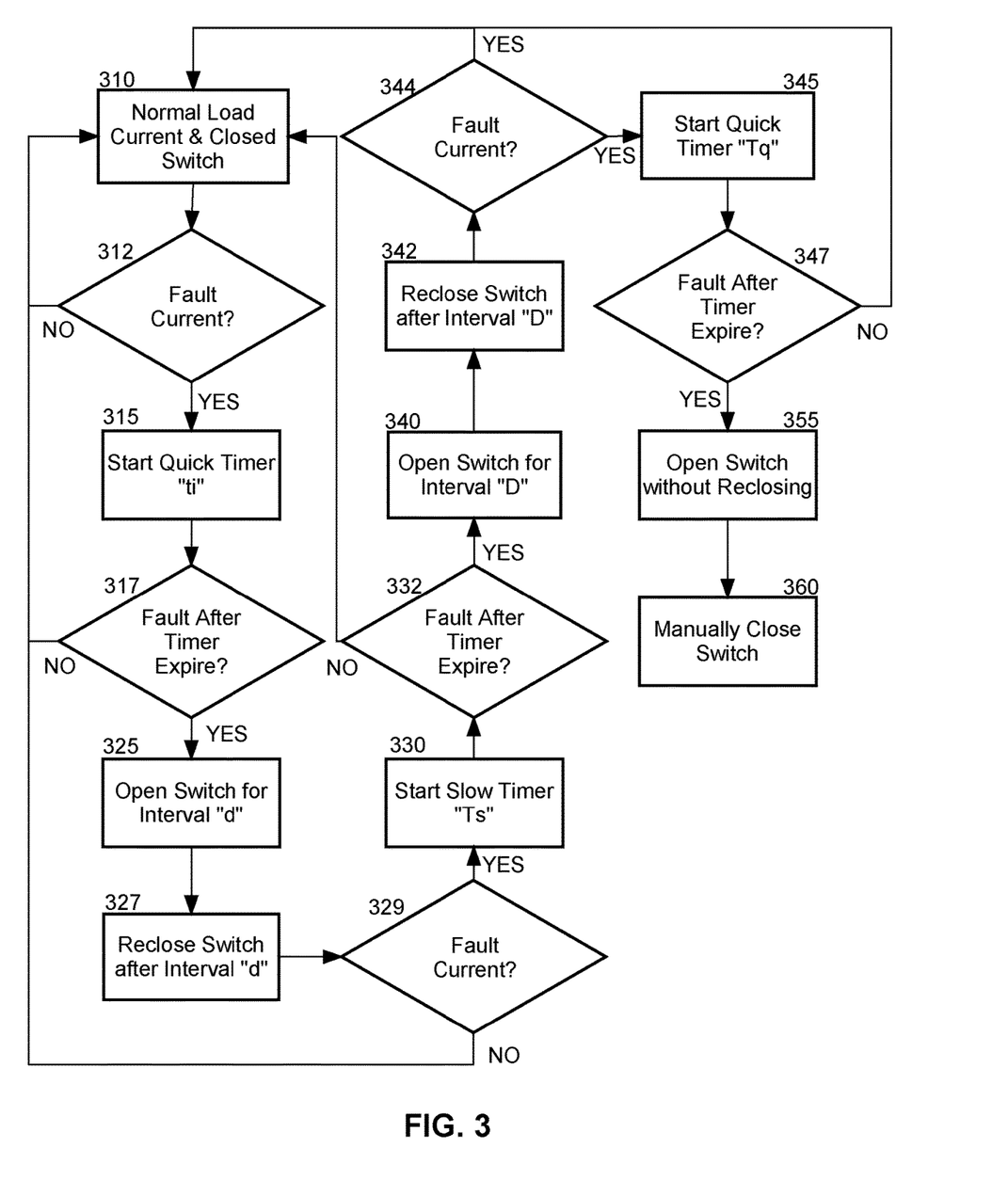
FIG. 3 is a flowchart illustrating a process for power distribution fault management utilizing quick-slow-quick trip timing in a reclosing sequence of reclosing switches in the reclosing switch of FIG. 2; and, FIG. 4 is a pictorial illustration of Time Current Curves (TCC) showing a process for coordinating reclosing sequencing between a feeder breaker relay of the electrical power distribution system of FIG. 1 and a reclosing switch of FIG. 2.

In even yet further illustration of the operation of the quick-slow-quick recloser module 300 of FIG. 2, FIG. 3 is a flowchart illustrating a process for power distribution fault management utilizing quick-slow-quick trip timing in a reclose sequence of the reclosing switch of FIG. 2. The block numbers of FIG. 3 have a corresponding numbered state of timing diagram 410 of FIG. 4 with the letter "A" suffix added. Beginning in block 310, normal load current is flowing through an initially closed reclosing switch. In block 312, a fault event occurs resulting in a high current condition and a rising edge of the timing diagram 312A. Then in block 315, a fault current timer is set to a "quick" time "$t_i$". In another example the time $t_i$ may be longer or shorter than $T_s$ without departing from the scope of this description. In block 317, if the fault clears and the current returns to normal load at the expiration of the quick timer, then the process returns to block 310 with the reclosing switch remaining closed and conducting normal load current. However, if the fault current remains present after expiration of the quick timer, then block 325 opens the reclosing switch for an interval "d". At the end of interval "d", block 327 recloses the reclosing switch. If the fault current is not present at block 329, then the process returns to block 310 with the reclosing switch remaining closed and conducting normal load current. If the fault current is present at block 329, a fault current timer is set to a "slow" time "$T_s$" in step 330. If in block 332 the fault clears and the current returns to normal load at or before the expiration of the slow timer then the process returns to block 310 with the reclosing switch remaining closed and conducting normal load current. However, if the fault current remains present after expiration of the slow timer then block 340 opens the reclosing switch for an interval "D". At the end of interval "D" block 342 recloses the reclosing switch for a second time. If the fault current is not present at block 344, then the process returns to block 310 with the reclosing switch remaining closed and conducting normal load current. If the fault current is present at block 344, a fault current timer is set to a "quick" time "$t_q$" in step 345. If in block 347 the fault clears and the current returns to normal load at or before the expiration of the second quick timer then the process returns to block 310 with the reclosing switch remaining closed and conducting normal load current. However, if the fault current remains present after expiration of the second quick timer, then block 355 opens the reclosing switch for an indefinite interval allowing for block 360 where the fault condition may be manually repaired, after which the reclosing switch may be manually closed and the process returns to block 310 with the reclosing switch closed and conducting normal load current.

In operation, if the fault persists, during the first quick interval "$t_i$", the reclosing switch quickly trips to an open state. The initial quick interval may reduce the duration of the voltage sag at end points on the upstream side of the reclosing switch relative to the fault, and any potential $I^2T$ damage to the upstream elements of the distribution system while being short enough to prevent a downstream protective device from opening. In the subsequent delay interval "d", the reclosing switch is open allowing additional time for the fault to clear. After interval "d", a first reclosing subsists for a long period of time, or an equivalent slow interval. The duration of this long period of time may be set to allow a downstream protective device, such as a fuse, to open should the fault condition persist while balancing voltage sag exposure and $I^2T$ exposure to upstream components. If the fault persists for the slow interval, then the reclosing switch trips opens again and remains in an open state for a second delay "D", providing additional time for the fault to clear. Then the reclosing switch is reclosed for a final quick duration "$t_q$". If the fault persists, then any downstream protective device was likely not able to isolate the fault and the reclosing switch quickly opens to remain open indefinitely without initiating a reclosing timer. Thereafter, the next closing of the switch may require a manual activation by a service crew to restore downstream power after inspecting for and potentially clearing a persistent fault condition. When compared to a quick-slow-slow operation, the quick-slow-quick approach reduces potential $I^2T$ damage to upstream elements.

Figure 4:
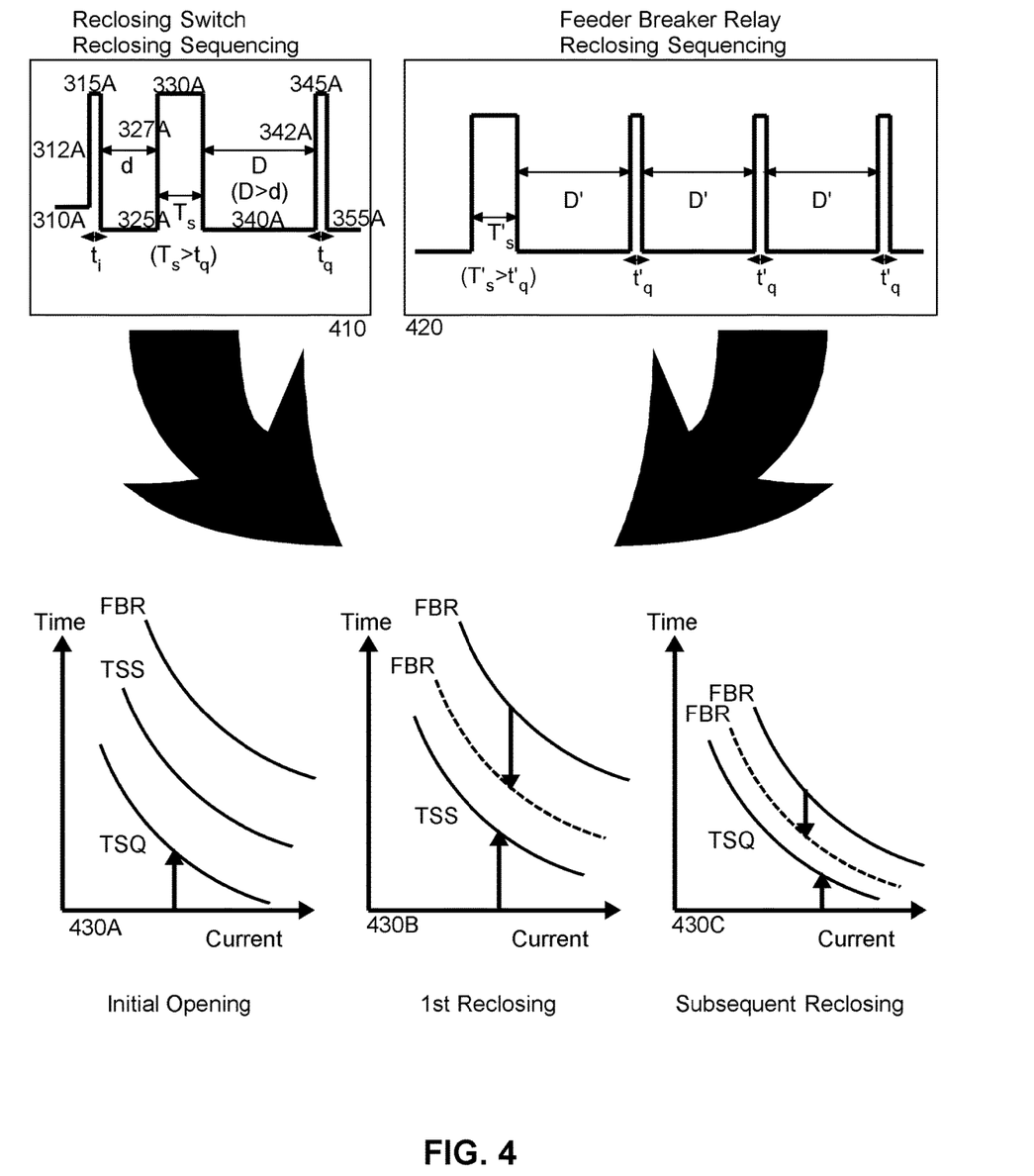

Advantageously, the quick-slow-quick reclosing sequencing of the reclosing switch may be coordinated with the reclosing sequencing of a relay in an upstream feeder breaker. In yet further illustration, FIG. 4 pictorially shows a process for coordinating a reclosing sequencing between a feeder breaker relay 125 of the electrical power distribution system of FIG. 1 and a reclosing switch of FIG. 2. As shown in FIG. 4, the reclosing sequencing 410 of the reclosing switch may be of the form quick-slow-quick in which a duration $t_i$ occurs based upon a change from normal load current to a fault current condition, 315A. Prior to the beginning of $t_i$ the load current is shown as average current above zero, 310A, the fault occurs at the beginning of $t_i$ for the duration of $t_i$. At the end of $t_i$ the reclosing switch trips open and the current goes to zero. The reclosing switch remains open for the duration of time "d" 325A and recloses at $T_s$, 327A. During $T_s$, 330A, the fault and corresponding high current persists for the duration of $T_s$ and in response at the end of $T_s$ the reclosing switch again trips open for interval D, 340A, and the current is again zero while the reclosing switch is open. At 342A the reclosing switch again recloses for the duration of $t_q$, 345A, and the high current persists for the duration of $t_q$. In response, the reclosing switch trips and remains open, 355A to be later closed by means other than the reclosing switch, by a repair crew on a truck roll for example.

The current through the reclosing switch is determined to be a fault current in response to the current exceeding a threshold. For example, a current exceeding a 600 amp threshold may be determined to be a fault current while a current below the 600 amp threshold may be determined to be a normal load current. Other current thresholds may be implemented while remaining within the scope of this invention. The duration of "d" and "D", while the reclosing switch is open, may be fixed or variable, and d may be equal to, greater or less than D. In one example the interval d corresponds to a two seconds in duration and interval D corresponds to five seconds in duration. The durations may or may not vary with the magnitude of the fault current. The duration of $t_i$ is quick compared to the duration of $T_s$, or ($T_s > t_i$). In an alternate example, the duration of $T_s$ is quick compared to the duration of $t_i$, or ($T_s < t_i$). Similarly, the duration of $t_q$ is quick compared to the duration of $T_s$, or ($T_s > t_q$). In another example, the duration of $t_q$ may substantially quicker than $T_s$, wherein $t_q$ may be one tenth or less compared to the duration of $T_s$, or ($T_s > 10*t_q$) at a given fault current. Reducing $t_q$ by an order of magnitude or more that $T_s$ provides substantial benefits in the aforementioned voltage sag and $I^2T$ performance advantage. The durations of $t_i$ and $t_q$ may or may not be equivalent. Furthermore $t_i$, $T_s$ and $t_q$ may or may not be dependent on the magnitude of the fault current where the durations decrease with an increase in fault current. In one example, at a fault current of substantially 1000 amps $t_i$ may be substantially 57 milliseconds, $T_s$ may be substantially 820 milliseconds and $t_q$ may be substantially 56 millisecond, while in another example at a fault current of substantially 2000 amps $t_i$ may be substantially 50 milliseconds, $T_s$ may be substantially 220 milliseconds and $t_q$ may be substantially 51 millisecond. In other examples the durations and currents may be modified while remaining within the scope of this disclosure.

In comparison, the reclosing sequencing 420 of the relay in the feeder breaker may be of the form slow-quick-quick-quick in which a duration $T'_s$ for the initial detection of a high current fault is long whereas the duration $t'_q$ of three subsequent reclosings is short ($T'_s > t'_q$). The slow-quick-quick-quick sequence may further allow for enhanced sequence coordination of downstream devices by allowing a downstream device to obtain a state of persistent opening and limiting the number of customers experiencing a sustained outage. In another example each closure may correspond to a $T_s$ duration, whereby at least one of the feeder breaker relays is adapted to reclose according to a slow-slow-slow-slow reclosing sequence so as to permit the reclosing switches to clear a detected fault without allowing for electrical damage by the detected fault of the one of the feeder breakers. In another example the initial closing sequencing 420 of the relay in the feeder breaker may be of the form quick-slow-quick-quick in which the initial $t'_q$ is short, the first reclosing is long and the remaining two reclosings quick once again prior to a persistent opening.

As shown in the time-current chart 430A for an initial trip, a time delay to trip based on the fault current magnitude experienced by the feeder breaker relay (FBR) sufficient to trip the feeder breaker relay remains longer than a time delay to trip based on the fault current magnitude experienced by the reclosing switch sufficient to trip the reclosing switch during an initial fault condition downstream of the reclosing switch processed by the first "quick" trip (TSQ) of the reclosing switch of quick duration. This is so because for a given fault current the time to trip the FBR is not reached before the reclosing switch becomes tripped so as to avoid tripping the FBR. However, during a first quick trip by the reclosing switch in which the fault remains, the current experienced by the FBR will cause the FBR to advance toward tripping.

Then, as shown in the time-current chart 430B for a first reclosing, subsequent to the initial opening, the subsequent delay, and the time to trip after the first reclose, the reclosing switch opens again for a duration of time. During the first reclosing by the reclosing switch (TSS) which lasts for a substantially longer duration than initial time to trip—the so-called "slow" portion of the reclosing sequence—a time delay to trip based on the fault current magnitude experienced by the FBR sufficient to trip the FBR still remains longer than a time delay to trip based on the fault current magnitude experienced by the reclosing switch sufficient to trip the reclosing switch if the fault condition persists.

Finally, as shown in the time-current chart 430C for a subsequent reclosing by the reclosing switch (TSQ), a time delay to trip based on the fault current magnitude experienced by the FBR sufficient to trip the FBR still remains longer than a time delay to trip based on the fault current magnitude experienced by the reclosing switch during the final quick reclosing by the reclosing switch. To the extent that the fault remains un-cleared even after the final, quick reclosing, the reclosing switch will remain open thus eliminating the opportunity for the current experienced by the FBR due to the fault to rise to a level sufficient to trip the FBR. However, because the final reclosing is TSQ, the duration of the fault current resulting from the quick, subsequent reclosing will not impact the FBR in a way sufficient to trip the FBR.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With the advent of the reclosing switch retrofitted into an existing power distribution system and set to operate in a quick-slow-quick operating mode in place of a fuse, several advantages may be realized. For example, a temporary fault in a lateral segment downstream of a fuse may result in the upstream reclosing switch quickly opening and the fault clearing without opening the fuse or the upstream FBR thereby minimizing the impact of a temporary fault event to endpoints downstream of the reclosing switch. In another example in the event of a permanent fault downstream of the fuse, the fuse opens, without opening the FBR while limiting permanent outages to endpoints down stream of the fuse.

In another example, for a fault in a lateral segment downstream of a reclosing switch reconfigured from a quick-slow-slow to a quick-slow-quick mode the event may result in either: the fault clearing without opening the FBR, thereby minimizing any temporary outage to endpoints downstream of the reclosing switch; or in the event of a permanent fault, the reclosing switch opening, without opening the FBR while providing reduced $I^2T$ exposure to elements upstream of the fault event, reduced duration of voltage sags at endpoints on the upstream side of the reclosing switch, and limiting permanent outages to endpoints down stream of the reclosing switch.

In another example, for a fault event in a feeder backbone downstream of the FBR and not beyond any other protective device the FBR operation may be advantageously adjusted to further reduce $I^2T$ exposure to equipment upstream of the fault event by allowing for the FBR to be reprogrammed to open quicker because of the reclosing switches being reprogrammed from quick-slow-slow to quick-slow-quick. For example, based upon a TCC analysis of a power distribution system retrofitted from a quick-slow-slow to a quick-slow-quick reclosing switch system, $T_s'$ of an upstream FBR may be reduced from≈2.57 seconds to≈1.41 seconds for a 1500 amp fault event, thereby reducing the duration of $I^2T$ exposure to upstream elements of the fault event and the voltage sag duration experienced by endpoints of the system by over 45%.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A power distribution system comprising:
   a substation coupled to a multiplicity of feeder breakers over a bus and distributing electrical power to each of the feeder breakers;
   each of the feeder breakers having a physical coupling over a feeder backbone to a multiplicity of lateral sections supplying a portion of the electrical power to different endpoints, wherein a respective feeder breaker of the feeder breakers is enabled with a feeder breaker relay adapted to reclose according to a first reclosing sequence, the first reclosing sequence being activated during a fault condition based on a current sensed by the feeder breaker relay; and,
   a multiplicity of reclosing switches each joining a selected one of the lateral sections to a corresponding feeder backbone of one of the feeder breakers in place of a fuse as a retrofit, wherein each of the multiplicity of reclosing switches sense current and operate autonomously in response to the sensed current over an interval of time, the reclosing switches each comprising a second reclosing sequence that is activated during the fault condition based on a current sensed by a respective reclosing switch,
   wherein the first reclosing sequence is different from the second reclosing sequence,
   wherein a first time delay to trip the respective feeder breaker based on the first reclosing sequence is greater than a first time delay to trip a respective reclosing switch of the reclosing switches based on the second reclosing sequence, and during the first time delay, if the respective reclosing switch is tripped, the respective feeder breaker is not tripped before the tripping of the respective closing switch, and a second time delay to trip the respective feeder breaker based on the first reclosing sequence is greater than a second time delay to trip the respective reclosing switch based on the second reclosing sequence, such that the first reclosing sequence and the second reclosing sequence permit the respective reclosing switch to clear a detected fault without allowing for electrical damage by the detected fault of the respective feeder breaker,
   wherein the second reclosing sequence is a quick-slow-quick sequence, the second reclosing sequence being coordinated with the first reclosing sequence of the respective feeder breaker in which the respective reclosing switch initially responds to the fault condition by tripping and then reclosing for a first duration of time prior to tripping once again, and then reclosing for a second duration of time less than the first duration of time prior to again tripping, whereby the time to trip of the first duration of time is slow and the time to trip of the second duration of time is quick, and
   wherein the first reclosing sequence terminates in response to the fault being cleared during the first duration of time or the second duration of time.

2. The system of claim 1, wherein for each of the reclosing switches, a delay in reclosing between the reclosing for the first duration of time and the reclosing for the second duration of time is longer than a delay in reclosing for the first duration of time subsequent to the tripping in response to the fault condition.

3. The system of claim 1, wherein the first reclosing sequence is a quick-slow-quick-quick reclosing sequence.

4. The system of claim 1, wherein a corresponding feeder breaker is enabled with a corresponding feeder breaker relay adapted to reclose according to either a slow-slow-slow-slow reclosing sequence, a slow-quick-quick-quick reclosing sequence, or a slow-quick-quick-slow reclosing sequence so as to permit the reclosing switches to clear a detected fault without allowing for electrical damage by the detected fault of the corresponding feeder breaker.

5. The system of claim 1, further comprising, for each of the lateral sections, a fuse disposed downstream from one of the reclosing switches joining a corresponding one of the lateral sections to the feeder backbone.

6. The system of claim 1, further comprising an automated feeder switch disposed in the feeder backbone.

7. The system of claim 1, wherein each of the multiplicity of reclosing switches do not communicate with a data processor via a wired or wireless transmission and do not receive commands from an external controller.

8. The system of claim 1, wherein a third time delay to trip the respective feeder breaker based on the first reclosing sequence is greater than a third time delay to trip the respective reclosing switch based on the second reclosing sequence, and if the detected fault is not cleared during the third time delay to trip the respective reclosing switch, the respective reclosing switch is opened, such that the respective feeder breaker is not tripped.

9. A power distribution fault management method comprising:
coordinating a feeder breaker relay for a feeder breaker that is adapted to reclose according to a first reclosing sequence and a reclosing switch that is adapted to reclose according to a second reclosing sequence that is different from the second reclosing sequence in a section of an electrical power distribution system to operate during a fault condition based on a current sensed by the reclosing switch, wherein the second reclosing sequence is a quick-slow-quick sequence, the reclosing switch initially responding to the fault condition by tripping and then reclosing for a first duration of time prior to tripping once again, and then reclosing for a second duration of time less than the first duration of time prior to again tripping, whereby the time to trip of the first duration of time is slow and the time to trip of the second duration of time is quick, and wherein the reclosing switch senses current and operates autonomously in response to the sensed current over an interval of time; and
energizing the section of the electrical power distribution system, wherein the second reclosing sequence terminates in response to the fault being cleared during the first duration of time or the second duration of time, and
wherein a first time delay to trip the feeder breaker based on the first reclosing sequence is greater than a first time delay to trip the reclosing switch based on the second reclosing sequence, and during the first time delay, if the reclosing switch is tripped, the feeder breaker is not tripped before the tripping of the closing switch, and a second time delay to trip the feeder breaker based on the first reclosing sequence is greater than a second time delay to trip the reclosing switch based on the second reclosing sequence, such that the first reclosing sequence and the second reclosing sequence permit the reclosing switch to clear a detected fault without allowing for electrical damage by the detected fault of the feeder breaker.

10. The method of claim 9, wherein a delay in reclosing between the reclosing for the first duration of time and the reclosing for the second duration of time is longer than a delay in the reclosing for the first duration of time subsequent to the tripping in response to the fault condition.

11. The method of claim 9, wherein the first reclosing sequence is a quick-slow-quick-quick reclosing sequence.

12. The method of claim 9, wherein the coordinating additionally includes configuring the feeder breaker relay to operate according to either a slow-slow-slow-slow reclosing sequence, a slow-quick-quick-quick reclosing sequence, or a slow-quick-quick-slow reclosing sequence.

13. The method of claim 9, wherein the first time delay to trip based on a fault current magnitude experienced by the feeder breaker relay sufficient to trip the feeder breaker relay is greater than the first time delay to trip based on a fault current magnitude experienced by the reclosing switch sufficient to trip the reclosing switch during the fault condition downstream of the reclosing switch.

14. A method comprising:
retrofitting a plurality of reclosing switches operating according to a first reclosing sequence that is a quick-slow-quick sequence in an electrical distribution system having an upstream programmable relay operating according to a second reclosing sequence that is different from the first reclosing sequence for opening a coupling between the programmable relay and the plurality of reclosing switches as a function of the programmable relay conducting a high magnitude fault current for a duration of time, the quick-slow-quick sequence comprising a closing sequence in which each of the reclosing switches initially responds to the fault condition by tripping and then reclosing for a first duration of time prior to tripping once again, and then reclosing for a second duration of time less than the first duration of time prior to again tripping, whereby the time to trip of the first duration of time is slow and the time to trip of the second duration of time is quick, wherein each of the plurality of reclosing switches sense current and operate autonomously in response to the sensed current over an interval of time; and
reprogramming the relay by reducing, based upon the retrofitting of the reclosing switches, the function of (1) either a magnitude of the high magnitude current level or the duration of time or both, (2) the high current fault level and (3) the duration of the duration of time for opening the relay, thereby producing a reduced function of the relay, and
wherein a first time delay to trip the upstream programmable relay based on the second reclosing sequence is greater than a first time delay to trip a respective reclosing switch of the plurality of reclosing switches based on the first reclosing sequence, and during the first time delay, if the respective reclosing switch is tripped, the upstream programmable relay is not tripped before the tripping of the respective closing switch, and a second time delay to trip the upstream programmable relay based on the second reclosing sequence is greater than a second time delay to trip the respective reclosing switch based on the first reclosing sequence, such that the first reclosing sequence and the second reclosing sequence permit the respective reclosing switch to clear a detected fault without allowing for electrical damage by the detected fault of the upstream programmable relay.

15. The method according to claim 14, further comprising opening the reprogrammed relay based upon the reduced function of the relay conducting the high magnitude fault current for the duration of time.

16. The method according to claim 14, wherein a delay of each of the reclosing switches in reclosing according to the quick-slow-quick sequence between a reclosing for the first duration of time and the reclosing for the second duration of time is longer than a delay in the reclosing for the first duration of time subsequent to the tripping in response to the fault condition.

17. The method according to claim 14, wherein the programmable relay operates according to a quick-slow-quick-quick reclosing sequence.

18. The method according to claim 14, wherein the programmable relay operates according to either a slowslow-slow-slow reclosing sequence, a slow-quick-quick-quick reclosing sequence, or a slow-quick-quick-slow reclosing sequence.

19. The method according to claim 14, wherein the first time delay to trip based on a fault current magnitude experienced by the programmable relay sufficient to trip the programmable relay is greater than a time delay to trip based on a fault current magnitude experienced by each of the plurality of reclosing switches sufficient to trip each of the plurality of reclosing switches during the fault condition downstream of at least one of the plurality of reclosing switches.

20. The method according to claim 14, wherein a fuse is disposed downstream from one of the plurality of reclosing switches joining a corresponding lateral section to a feeder backbone of the electrical distribution system.

21. The method according to claim 14, further comprising an automated feeder switch disposed in the feeder backbone.

\* \* \* \* \*